United States Patent
Wrenn et al.

(10) Patent No.: US 10,383,355 B2
(45) Date of Patent: Aug. 20, 2019

(54) SMOKELESS TOBACCO PRODUCT SIZED, SHAPED AND ADAPTED FOR ORAL CONSUMPTION

(75) Inventors: Susan E. Wrenn, Chesterfield, VA (US); Maria Carolina Marun, Midlothian, VA (US)

(73) Assignee: Philip Morris USA, Inc., Richmond, VA (US)

( * ) Notice: Subject to any disclaimer, the term of this patent is extended or adjusted under 35 U.S.C. 154(b) by 193 days.

(21) Appl. No.: 13/113,540

(22) Filed: May 23, 2011

(65) Prior Publication Data

US 2011/0220135 A1 Sep. 15, 2011

Related U.S. Application Data

(62) Division of application No. 11/802,539, filed on May 23, 2007, now Pat. No. 7,946,296.

(60) Provisional application No. 60/808,553, filed on May 26, 2006.

(51) Int. Cl.
| | |
|---|---|
| *A24B 15/14* | (2006.01) |
| *A24B 3/14* | (2006.01) |
| *A24B 15/16* | (2006.01) |
| *A24B 13/00* | (2006.01) |
| *A23L 27/00* | (2016.01) |

(52) U.S. Cl.
CPC ............. *A24B 15/16* (2013.01); *A23L 27/79* (2016.08); *A24B 3/14* (2013.01); *A24B 13/00* (2013.01); *A24B 15/14* (2013.01)

(58) Field of Classification Search
CPC ................................. A23L 1/2205; A24B 3/14
See application file for complete search history.

(56) References Cited

U.S. PATENT DOCUMENTS

| | | | | |
|---|---|---|---|---|
| 3,225,633 | A | * 12/1965 | Gustavson | ........................ 83/152 |
| 3,589,373 | A | * 6/1971 | Hooper | ............................ 131/78 |
| 4,256,126 | A | * 3/1981 | Seligman | .............. A24B 15/165 |
| | | | | 131/353 |
| 4,319,593 | A | 3/1982 | Pinion et al. | |
| 4,974,609 | A | 12/1990 | Southwick et al. | |

(Continued)

FOREIGN PATENT DOCUMENTS

| | | |
|---|---|---|
| EP | 0565360 A2 | 10/1993 |
| JP | 60133868 A | 7/1985 |

(Continued)

OTHER PUBLICATIONS

International Search Report and Written Opinion dated Jan. 17, 2008 for PCT/IB2007/002540.

(Continued)

*Primary Examiner* — Michael J Felton
(74) *Attorney, Agent, or Firm* — Harness, Dickey & Pierce P.L.C.

(57) ABSTRACT

A consumable tobacco film strip adapted to dissolve in the oral cavity includes a tobacco component, a binder, a humectant, and optionally a flavorant. The tobacco component can include ground or powdered tobacco and/or a tobacco extract. Tobacco flavoring can be incorporated in the film strip by casting or extruding a mixture or the tobacco component may be added to a film strip after formation of the film. The film strips are adapted to dissolve and provide tobacco satisfaction.

14 Claims, 4 Drawing Sheets

(56) References Cited

U.S. PATENT DOCUMENTS

| | | | |
|---|---|---|---|
| 5,065,776 A * | 11/1991 | Lawson | A24B 15/165 131/194 |
| 5,092,352 A | 3/1992 | Sprinkle, III et al. | |
| 5,167,244 A | 12/1992 | Kjerstad | |
| 5,325,877 A * | 7/1994 | Young | A24B 15/24 131/370 |
| 5,396,911 A * | 3/1995 | Casey et al. | 131/352 |
| 5,501,238 A | 3/1996 | Von Borstel et al. | |
| 5,525,351 A | 6/1996 | Dam | |
| 5,724,998 A | 3/1998 | Gellatly et al. | |
| 5,778,899 A | 7/1998 | Saito et al. | |
| 6,110,485 A | 8/2000 | Olejnik et al. | |
| 6,596,298 B2 | 7/2003 | Leung et al. | |
| 6,676,959 B1 | 1/2004 | Andersson et al. | |
| 7,308,898 B2 | 12/2007 | Monsalud, Jr. et al. | |
| 2003/0178039 A1 | 9/2003 | White et al. | |
| 2003/0211136 A1 | 11/2003 | Kulkarni et al. | |
| 2004/0118422 A1 | 6/2004 | Lundin et al. | |
| 2004/0120991 A1 | 6/2004 | Gardner et al. | |
| 2004/0247649 A1 | 12/2004 | Pearce et al. | |
| 2005/0056294 A1 | 3/2005 | Wanna et al. | |
| 2005/0079253 A1 | 4/2005 | Nakamura | |
| 2005/0244521 A1 | 11/2005 | Strickland et al. | |
| 2006/0191548 A1 | 8/2006 | Strickland et al. | |

FOREIGN PATENT DOCUMENTS

| | | |
|---|---|---|
| WO | WO 2004/056219 A1 | 7/2004 |
| WO | WO 2004/095959 A1 | 11/2004 |

OTHER PUBLICATIONS

International Preliminary Report on Patentability dated Dec. 11, 2008 for PCT/IB2007/002540.

Official Action dated Jul. 20, 2012 for Japanese Patent Appln. No. 2009-512707.

* cited by examiner

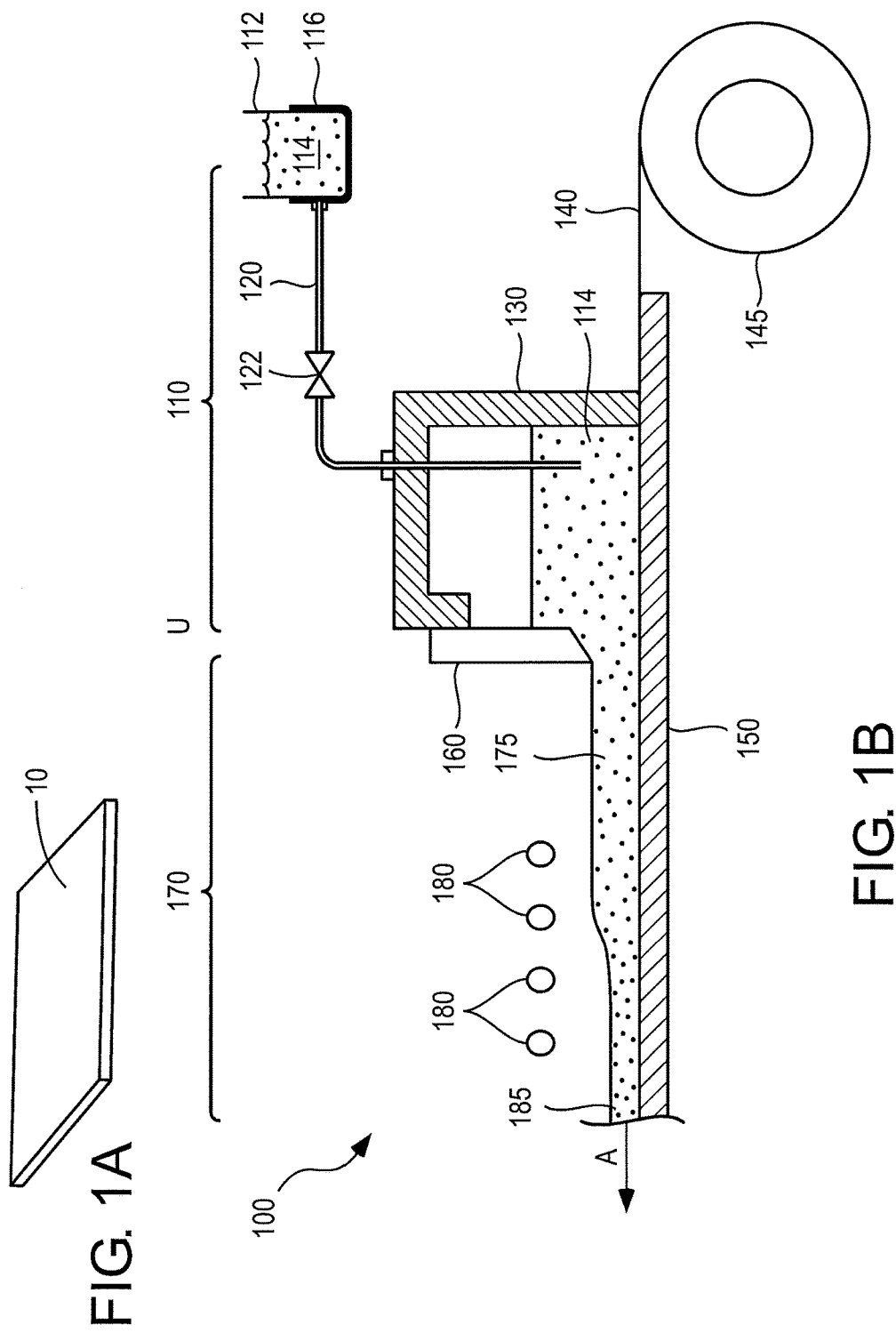

SMOKELESS TOBACCO PRODUCT SIZED, SHAPED AND ADAPTED FOR ORAL CONSUMPTION

This application is a divisional of U.S. patent application Ser. No. 11/802,539, entitled DISSOLVABLE TOBACCO FILM STRIPS AND METHOD OF MAKING THE SAME, filed on May 23, 2007, now U.S. Pat. No. 7,946,296, which claims priority under 35 U.S.C. § 119(e) to U.S. Provisional Application Ser. No. 60/808,553, filed May 26, 2006, the entire content of each is incorporated herein by reference.

BACKGROUND

Smokeless tobacco products, such as chewing tobacco and snuff, include an insoluble, residual component in an amount that typically requires disposal. Accordingly, there is an interest in a wholly dissolvable smokeless tobacco products that provide tobacco enjoyment.

SUMMARY

A dissolvable tobacco film strip is adapted to be consumed orally and comprises a tobacco component, (optionally) a flavorant, a humectant and a binder.

A first preferred method of making a tobacco film strip comprises forming a mixture of at least one tobacco component, at least one humectant and at least one binder with one or more optional components. The method can further include casting or extruding the mixture to form a film, drying the film, and cutting the film into film strips.

A second preferred method of making a tobacco film strip comprises forming a first mixture of at least one humectant and/or at least one binder, forming a second mixture comprising at least one tobacco component, casting or extruding the first mixture to form a first film, depositing the second mixture on at least one side of the first film, drying the first film, and cutting the film into film strips. The step of depositing the second mixture, which is preferably deposited on a substantially dry film, can comprise printing and/or spray coating. In the alternative, the two mixtures are mixed together prior to casting.

The humectant preferably comprises one or more polyhydric alcohol, aliphatic ester of mono-, di- or polycarboxylic acid. Glycerin is a preferred humectant.

The binder can comprise pullulan, cellulose ethers, sodium alginate, pectin, gums and mixtures thereof. A preferred gum is a natural gum.

The tobacco component preferably comprises a ground or powdered tobacco (e.g., ground or powdered laminae and/or stem) and/or a tobacco extract. The tobacco component is preferably made from a cured tobacco. In one embodiment, the ground or powdered tobacco has an average particle size of between about 100 nm and 1 mm. For example, the tobacco component can have a particle size of about 60 mesh or finer. A preferred particle size is 200 to 400 mesh, more preferably 300 to 400 mesh. In a further embodiment, the ground or powdered tobacco has an average particle size of less than the thickness of the film strip.

The tobacco component can be incorporated within the film strip, or disposed along at least one free surface thereof (e.g., as a coating or a pattern) or both.

The film strip can comprise one or more optional additives such as flavorants, sweeteners, fragrances, coloring agents, filling agents and preservatives.

The film strip can comprise a single film or a two or more layers that are laminated together (e.g., a multi-layer film strip). In an embodiment, a tobacco component is incorporated between at least two of the layers of a multi-layer film strip.

A preferred film strip has an average thickness of from about 50 to 500 microns or greater and is adapted to be completely orally dissolved. A preferred film strip is both dissolvable and spitless. A preferred film strip is dried to an oven volatiles content of about 10 to 30% (e.g., 17-18%) and water activity of about 0.1 to 1% (e.g., 0.5%).

BRIEF DESCRIPTION OF THE DRAWINGS

FIG. 1A is a perspective view of a preferred embodiment.

FIG. 1B is a schematic view of an apparatus for casting a dissolvable film strip.

DETAILED DESCRIPTION OF PREFERRED EMBODIMENTS

Figure 2A:
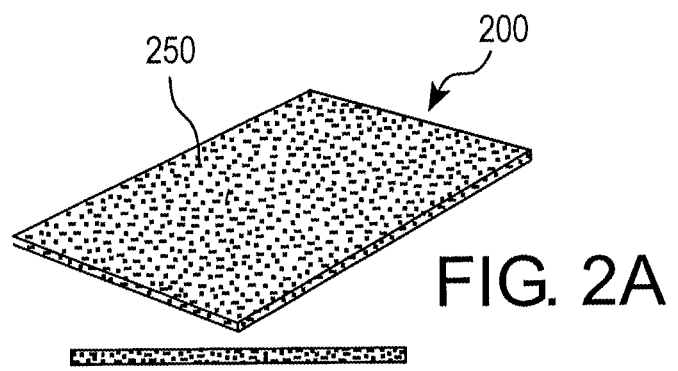
FIGS. 2A-2C are perspective views of single-layer dissolvable film strips.

Referring to FIG. 1A, an exemplary dissolvable film strip 10 is adapted to be consumed orally and includes a tobacco component, a humectant, a binder and optionally ingredients such as a flavorant and/or other optional component described below. The film strip is adapted to provide tobacco satisfaction. Methods of forming such film strips include casting and extruding.

The film strips include a binder which preferably comprises pectin and/or natural gum such as guar gum, xanthan gum, locust bean gum, gum Arabic, sodium alginate, carrageenan gum, tamarind gum and blends thereof.

A preferred composition of the film strip 10 comprises about 50 to 80% by weight tobacco component, about 3 to 12% by weight binder and about 20 to 40% by weight humectant. The optional flavorant can be added in an effective amount to provide desired flavoring of the film with preferred amounts of flavorant ranging from 1 to 6 wt. %, more preferably 3 to 6 wt. %.

The film strip composition preferably contains amounts of tobacco, binder, humectant and optionally flavorants which provide a balance between desired mechanical properties (such as sheet strength and flexibility) and desired organoleptic properties (such as its taste, dissolvability, mouthfeel).

Preferably, the amount of tobacco is at or above 50% by weight to impart a desired tobacco flavor. The amount of binder is preferably below approximately 10% by weight, more preferably about 6%, to minimize impact of the binder constituent on the desired tobacco flavor. The amount of humectant is preferably above approximately 20% to provide desired texture, mouthfeel and flexibility to the film so that the film may withstand handling even with the reduced inclusion levels of binder. The relatively low binder and high humectant contents can provide rapid dissolvability of the film.

Preferably, the tobacco component comprises ground or powdered tobacco and/or optionally a tobacco extract. The tobacco component may include its own tobacco flavorants (flavor enhancers), but preferably, flavors are added separately as one or more discrete ingredients of the film composition.

One or more tobacco components can also be incorporated in exemplary film strips. As used herein, "incorporated in" means that a component (e.g., a tobacco component or other optional component) can be mixed with other components used to form a film strip and/or added to (e.g., sprayed on, printed on, dusted on, etc.) a film strip as a coating or layer during or after formation of the film.

The tobacco component preferably comprises finely ground particles of a blend of tobaccos, including blends comprising Bright, Burley and Oriental tobaccos and other blend components, including traditional tobacco flavors and/or tobacco flavor enhancers such as those used in cigarettes. The tobacco component may instead comprise individual tobacco blend components, such as the natural tobaccos, reconstituted tobacco sheet, and/or tobacco substitutes of natural or synthetic origin. The tobacco component may comprise a blend of Bright, Burley and/or Oriental tobaccos with or without inclusion of reconstituted tobaccos or flavorings. A single variety of the aforementioned tobaccos may be used instead of a blend. The tobacco may be cured or uncured; however, cured tobacco is preferred.

The tobacco component preferably comprises ground or powdered tobacco laminae and/or stem (e.g., tobacco fines) having an average particle size of less than about 1 mm (e.g., less than about 0.5 mm or less than about 0.1 mm). Further, the average particle size is preferably greater than about 100 nanometers or greater than about 1 micron. A more preferred average particle size is between about 1 micron and 0.1 mm (e.g., 400 mesh tobacco dust, wherein 95% of the particles pass through a mesh of 400 wires per square inch).

According to an embodiment, the tobacco component can be incorporated into a film strip wherein the tobacco component has an average particle size of less than the thickness of the film strip, more preferably less than about one half the thickness of the film strip (e.g., less than 0.3, 0.2, 0.1, 0.05, 0.02 or 0.01 times the thickness of the dried film strip). Preferably, the tobacco is aged, cured and shredded (or ground) before the tobacco is incorporated into a film strip. Preferred tobacco components include ground or shredded tobacco, and mixtures thereof. Optionally, the tobacco component may comprise shredded, ground and/or powdered expanded (puffed) tobacco. The tobacco particles may also include one or more binders, which agglomerate smaller particles of tobacco together, and which may also hold fillers, flavorants, and other additives and adhere these to the tobacco particles. Binders suitable for agglomerating tobacco particles together include those described herein as suitable for use in forming the film strip.

The exemplary film strips preferably comprise a tobacco component in an amount effective to impart a desired tobacco flavor to the film strips. Preferably the amount of tobacco component is effective to provide tobacco satisfaction. Thus, the amount per film strip of one or more tobacco components can be selected as a function of, for example, the desired flavor impact, the flavor desired and/or other desired organoleptic effects. By way of example, the film strip preferably comprises from about 50 to 80 wt. %, more preferably from about 55 to 65 wt. %, tobacco component, based on the final, dried film composition.

In addition to the tobacco component, humectant and binder components, the film strips may further comprise optional components that may be added in effective amounts to control the organoleptic, aesthetic and/or mechanical properties of the films. Optional additives include, but are not limited to, additional flavorants, sweeteners, fragrances, coloring agents, filling agents, preservatives, salts and the like.

Also, the tobacco component can include one or more tobacco agents (or flavorants, flavor enhancers), such as those described in commonly-owned U.S. Pat. No. 4,974,609, hereby incorporated by reference in its entirety. For example, suitable tobacco-flavoring components include, but are not limited to flavoring agents blended with tobacco, tobacco substitutes, or a mixture thereof. Exemplary natural and artificial flavorants include, but are not limited to, peppermint, spearmint, wintergreen, menthol, cinnamon, chocolate, vanillin, licorice, clove, anise, sandalwood, geranium, rose oil, vanilla, lemon oil, cassia, fennel, ginger, ethylacetate, isoamylacetate, propylisobutyrate, isobutylbutyrate, ethylbutyrate, ethylvalerate, benzylformate, limonene, cymene, pinene, linalool, geraniol, citronellol, citral, orange oil, coriander oil, borneol, fruit extract, and the like. Particularly preferred additional flavor and aroma agents are essential oils and essences of coffee, tea, cacao, and mint. The flavorants can be added in encapsulated or non-encapsulated form.

The exemplary film strips may optionally comprise both natural and artificial sweeteners. Preferred sweeteners include water soluble sweeteners such as monosaccharides, disaccharides and polysaccharides (e.g., xylose, ribose, sucrose, maltose, fructose, glucose, maltose, mannose). In addition, or in the alternative to sweeteners, the exemplary film strips can comprise souring agents such as acetic acid, adipic acid, citric acid, lactic acid, malic acid, succinic acid, tartaric acid, and mixtures thereof.

Exemplary film strips can also include pigments (e.g., coloring agents) in an amount sufficient to impart a desired color or color pattern to the strips. Coloring agents can be incorporated into the mixture of components used to form the films and/or coloring agents can be applied to (e.g., printed on) one or more surfaces of a film strip. Coloring agents can be incorporated into the film strips in an effective amount up to about 5 wt. % of the final, dried film composition, more preferably up to about 2 wt. %.

Filling agents can be used to control the film's physical properties (e.g., texture, weight, etc.). Exemplary filling agents include, but are not limited to, cellulose, titanium oxide, magnesium silicate (e.g., talc), aluminum silicate, magnesium carbonate, calcium carbonate (e.g., limestone), calcium phosphate, calcium sulfate, zinc oxide, aluminum oxide, and mixtures thereof.

Exemplary film strips can also optionally comprise preservatives. Exemplary preservatives include, but are not limited to, acetic acid, benzoic acid, citric acid, lactic acid, malic acid, sorbic acid and tartaric acid.

The film strips can be translucent or substantially opaque.

Exemplary film strips can be made by casting or extruding a liquid mixture comprising one or more tobacco components, one or more binders, one or more humectants and optionally one or more flavorants; and then drying the cast or extruded film. In an embodiment, a first aqueous mixture of the tobacco component and optional flavorant is combined with a second aqueous mixture of the humectant and binder, followed by casting or extruding the combined mixtures.

According to a first method, film strips can be made by casting. A method of casting film strips comprises forming a homogeneous mixture (or slurry) of at least one tobacco component, a binder, a humectant and optionally, a flavorant; and casting the mixture to form a film, drying the film, and cutting the film into film strips.

Optionally, the tobacco can be pasteurized by any suitable technique. For example, the tobacco component can be pasteurized by high pressure, heat and/or steam. Alternatively, a slurry of the tobacco could be heated to pasteurize the tobacco. Other pasteurizing techniques can also be used.

The mixture can be formed by combining the components together with a suitable liquid in a container such as a mixing vessel and optionally heating the mixture to a temperature sufficient to cast or extrude the mixture. A preferred liquid is water, although a mixture of liquids such as water and alcohol (ethanol) can be used. In embodiments where the tobacco component comprises ground or powdered tobacco, some compounds from the tobacco are expected to go into solution. Preferably, the mixing vessel is temperature controlled.

The mixture can be dispensed from the mixing vessel to form a film. The mixture is preferably cast onto a substrate or a forming surface and then dried. For example, the mixture can be dispensed (e.g., poured or sprayed) onto a surface and spread out over an area of the surface under the influence of gravity, and/or by spinning and/or using a suitable tool such as a doctor blade or other device. In the alternative, the film can remain with the substrate, which would be peeled away prior to use. The rate of dispensation can be adjusted to control the thickness of the film.

Suitable forming techniques include, but are not limited to, gravure printing, slot die casting, and tape casting. During the dispensing, the viscosity of the mixture can be controlled by controlling the temperature of the mixture. Preferably, a film of a predetermined thickness is formed on the forming surface.

The mixture can be metered onto a forming surface via a suitable coating or casting system. A suitable apparatus for dispensing the mixture of components may comprise a manifold, one or more conduits, nozzles, valves, and/or blades, and the like. For example, a slot-coating die can maintain a mixture at a substantially constant temperature and pressure for dispensing a film of a predetermined thickness using the mixture.

The aforementioned surface can be a surface of the substrate or the surface of a carrier tape adapted to move over the substrate. Further, the surface is preferably adapted to form a uniform film thereon, and adapted to release a dried film therefrom. The forming surface can be formed from any suitable material including glass, stainless steel, Teflon, polyethylene, wax, and the like.

A preferred casting method is tape casting. Tape casting is a shape forming technique that can produce uniform, thin flat sheets. With tape casting, a mixture of components (e.g., solution or slurry) is deposited on a moving carrier tape by the shearing action of a doctor blade, and dried to form a film. The dried film can be removed from the carrier for further processing (segmenting, packaging, etc.) Advantageously, the tape casting method is adapted to be a continuous, batch process.

The cast film is preferably air dried using a drying oven, one or more heat lamps, a vacuum dryer or any other suitable drying system. Preferred drying systems are adapted to measure and control temperature and/or humidity in one or more heating zones.

During the drying step, liquid is preferably removed from the cast film, but preferably the drying does not remove volatile or semi-volatile tobacco flavor compounds. The drying system can heat the cast film in stagnant or circulating air (e.g., re-circulating air). After drying, the film preferably has an oven volatiles content of about 10 to 30% (e.g., 17-18%) and water activity of about 0.1 to 1% (e.g., 0.5%). Alternatively, the cast film can be dried by heating of the substrate onto which the film is cast, or by simply allowing the film to dry at room temperature. Drying times can range from an hour or less, e.g., when the film is heated, to a day or more, e.g., when the film is allowed to dry at room temperature.

After the film is dried it can be cut into individual film strips and then removed (e.g., delaminated) from the surface. Alternatively, removal from the surface can precede cutting. The cutting can comprise laser cutting, die cutting, or other suitable film segmenting technique.

An illustration of a tape casting apparatus 100 for forming film strips is shown in FIG. 1B. The apparatus 100 comprises a forming section 110 and a film drying section 170. The apparatus may further comprise a film segmenting section (not shown), which can segment, score, or delineate, etc., each film strip for individual or multiple use, as desired.

Section 110 comprises a mixing vessel 112, which is adapted to contain a mixture or slurry 114. According to a preferred method, the mixture comprises at least one tobacco component, at least one binder, at least one humectant, and optionally a flavorant and/or other optional component. The temperature of the mixture within the mixing vessel can be controlled via optional mixing vessel heater 116. Fluid conduit 120 and valve 122 provide fluid communication between the mixing vessel and a slip hopper 130. In operation, the mixture is deposited via slip hopper 130 onto a surface (e.g., top surface) of carrier tape 140. The carrier tape can be fed from a roll of carrier tape 145 through the section via support 150. The direction of motion of the carrier tape is indicated by arrow "A".

The mixture is drawn out beneath doctor blade 160 by the relative motion of the carrier tape. The initial thickness of a wet (as-cast) film 175 can be controlled by varying the height of the blade 160 above the carrier tape 140 and/or by varying the viscosity of the mixture. As the film is moved via the carrier tape from the forming section to the drying section, infrared lamps 180 or other suitable heating element(s) can substantially dry the film. As moisture is removed from the cast film, the density of the film will increase as the thickness of the film decreases. Preferably, the film is dried in a flow of re-circulating air. A dried film 185 can be segmented to form film strips and packaged.

According to a second method, exemplary film strips can be made by extrusion. A method of extruding a film strip comprises forming a homogeneous mixture of at least one tobacco component, at least one binder, at least one humectant, and optionally a flavorant and/or other optional component, extruding the mixture through a film-forming die onto a surface to form a film, drying the film, and cutting the film into film strips.

A single layer film strip can be extruded as a free-standing film. Successive layers in a multi-film film strip can be extruded onto a previously-formed layer and laminated together (e.g., via the application of heat, pressure and/or a binding agent). Extrusion is a preferred method of making multi-layer film strips.

In embodiments where film strips are formed by casting or extrusion, preferably the tobacco component is incorporated into the mixture used to form the film. Moreover, it is preferred that optional components are added to the mixture used to form the film. However, according to an embodiment, the tobacco component and/or other optional components can be added to (e.g., sprayed or printed on) one or more film surfaces after formation of the film. When adding the tobacco component and/or other optional component after formation of the film, particles of one or both of these components can be introduced to the surface of the film before the surface has completely dried, and preferably while the surface is still tacky or adherent to the introduced particles.

Alternatively or in addition, the introduced particles may be supplied with a binding agent that functions to adhere at least a part of one or more particles to the surface of the film. This binding agent is desirably an edible material, preferably containing one or more of the same components used to form the film, more preferably a water-soluble or water-dispersible polysaccharide. This binding agent may be co-applied simultaneously with the introduced particles, or just prior or subsequent to application of the particles, and may be incorporated into or on the introduced particles.

However the particles are applied, the strip with particles on it may be coated with a layer of coating material, e.g. a thin layer of film material or other edible polysaccharide. An exemplary coating includes a desiccant, which can be formed on one side, preferably both sides, of a film strip.

The film strips are sized and shaped to be place in the mouth and consumed orally. Preferred film strips are sized to fit on the tongue or on the roof of the mouth and can have length and width dimensions ranging from about 5 mm to 50 mm. While preferred film strips are shaped as squares or rectangles, the film strips may be round, oval, triangular, trapezoidal or any other Euclidean shape. A preferred film strip is thin and has a thickness from about 50 to 500 microns (e.g., from about 50 to 100 microns for thinner strips, about 100 to 200 microns for mid-thickness strips, or about 200 to 500 microns for thicker strips) based upon the desired taste level, mouth-feel, packaging, etc. However, the film strip can have a thickness greater than 500 microns.

The film strips are adapted to dissolve rapidly, e.g., in less than about 60 seconds, preferably in less than about 30 seconds, more preferably in less than about 20 seconds. The film strips are adapted to be entirely consumed.

Figure 2B:
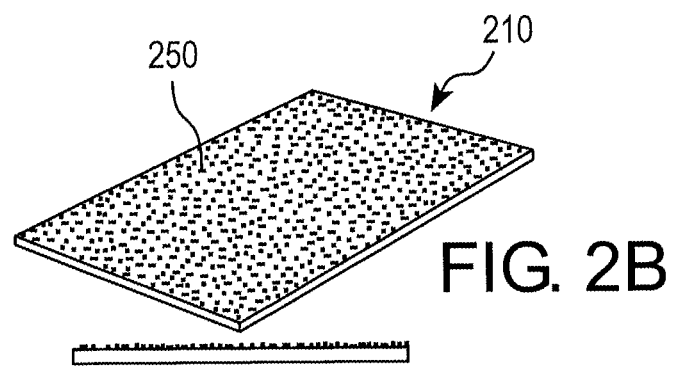
Figure 2C:
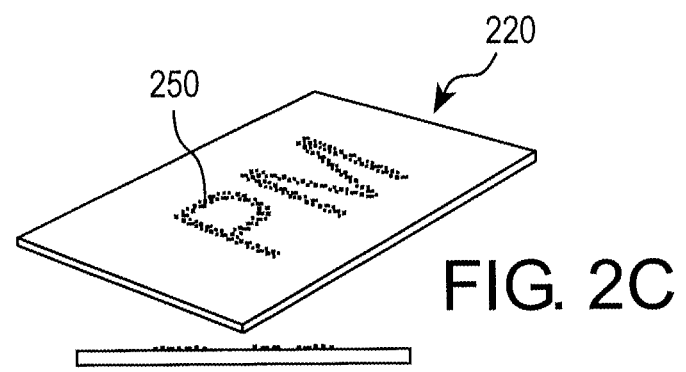

According to an embodiment, the film strips can comprise a single film layer. Several embodiments of a single-layer film strip are illustrated in FIGS. 2A-C. FIG. 2A shows a single-layer film strip 200 comprising a substantially homogeneous distribution of ground tobacco particles 250 incorporated therein. FIG. 2B shows a single-layer film strip 210 comprising a substantially homogeneous distribution of ground tobacco particles 250 formed on one side of the film strip. FIG. 2C shows a single-layer film strip 220 comprising a patterned distribution of ground tobacco particles 250 formed on one side of the film strip. In each of the embodiments shown in FIGS. 2A-2C, in addition to or in lieu of tobacco particles, the single-layer film strip can comprise a homogeneous or non-homogeneous distribution of tobacco extract and/or tobacco flavoring agent.

According to a further embodiment, the film strips can comprise two or more layers, wherein adjacent layers are bonded (e.g., laminated) together to form a unitary film strip. Each layer in a multi-layer film strip can be substantially the same. Preferably, the lateral dimensions (e.g., length and width) of individual films in a multi-layer film strip are substantially the same. However, two or more layers in a multi-layer film strip can be substantially different. For example, the thickness and composition (e.g., amount, distribution and/or kind of tobacco component) in each layer in a multi-layer film strip can be different. These parameters can be varied to provide, e.g., different rates of dissolution, different flavors or combinations of flavors, different mouth feels, or combinations of these, for each layer. By varying the composition and properties of each layer in the strip, the consumer's experience can vary in a pleasing fashion.

One method for forming the film strip from laminated layers is placing the layers into contact with each other while at least one surface of at least one of the layers has not yet fully dried, e.g., is still sufficiently tacky to adhere to the adjacent surface of the other layer. Alternatively or additionally, a layer can be formed by extrusion or casting onto the surface of an already formed layer. Alternatively or additionally, two or more formed and dried layers can be adhered together by introducing between their respective opposing surfaces binding agent, which adheres to both of the opposing surfaces and binds them together. Preferably this binding agent is an edible material, preferably containing one or more of the same components used to form the film, more preferably a water soluble polysaccharide. The material may be applied by any suitable technique, e.g., by spray coating, extrusion, casting, and the like.

Figure 3:
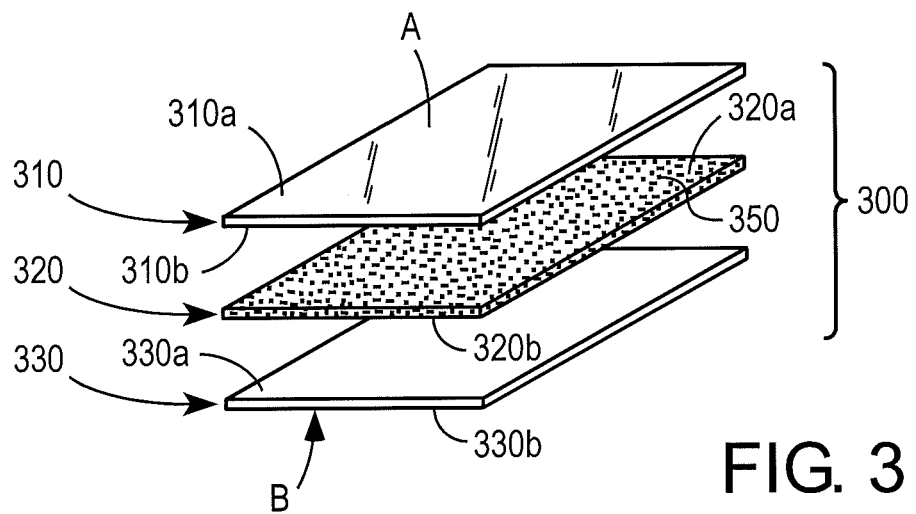
FIG. 3 is an exploded view of a multi-layer dissolvable film strip according to a first embodiment.

FIG. 3 shows an exploded view of multi-layer film strip 300 according to a preferred embodiment. The film strip 300 comprises first layer 310, second layer 320, and third layer 330. First layer 310 comprises a first thin film; second layer 320 comprises a second thin film; and third layer 330 comprises a third thin film. The individual films 310, 320, 330 can be formed by casting or extruding. Though FIG. 3 shows a three-layer film strip, multilayer film strips can comprise fewer than three layers (e.g., two layers), or more than three layers (e.g., four, five, six or more layers). Referring still to FIG. 3, first side 310a of first layer 310 forms free surface A and second side 310b of first layer 310 is laminated to first side 320a of second layer 320. Likewise, second side 320b of second layer 320 is laminated to first side 330a of third layer 330 and second side 330b of third layer 330 forms free surface B. Second layer 320 comprises a substantially homogeneous distribution of ground tobacco particles 350 incorporated therein. First, second and/or third layers may optionally comprise a homogeneous or non-homogeneous distribution of tobacco extract and/or tobacco flavoring agent. According to the embodiment illustrated in FIG. 3, the appearance of side A of film strip 300 is substantially identical to the appearance of side B. In the FIG. 3 embodiment, the through-thickness distribution of tobacco particles is substantially symmetric.

Figure 4:
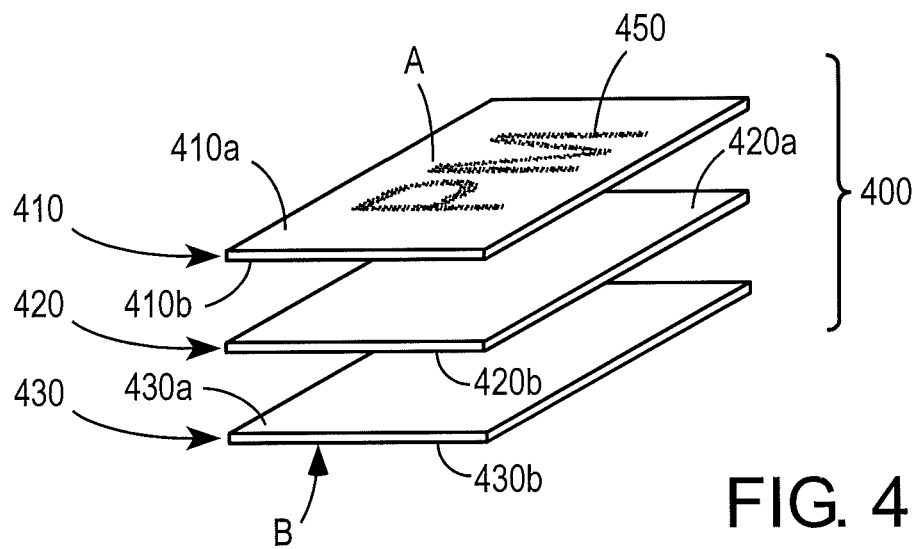
FIG. 4 is an exploded view of a multi-layer dissolvable film strip according to a second embodiment.

FIG. 4 shows an exploded view of multi-layer film strip 400 according to yet a further embodiment. The film strip 400 comprises first layer 410, second layer 420 and third layer 430. First layer 410 comprises a first thin film; second layer 420 comprises a second thin film; and third layer 430 comprises a third thin film. The individual films 410, 420, 430 can be formed by casting or extruding.

As with the embodiment discussed above in reference to FIG. 3, first side 410a of first layer 410 forms free surface A and second side 410b of first layer 410 is laminated to first side 420a of second layer 420. Also, second side 420b of second layer 420 is laminated to first side 430a of third layer 430 and second side 430b of third layer 430 forms free surface B. However, in contrast to the FIG. 3 embodiment, first layer 410 comprises a patterned (e.g., printed) layer of ground tobacco particles 450 formed thereon. According to the embodiment illustrated in FIG. 4, side A of film strip 400 has a different appearance than side B. In the FIG. 4 embodiment, the through-thickness distribution of tobacco particles is substantially asymmetric.

In an alternative embodiment, first layer 410 can comprise a homogeneous distribution of tobacco particles. First, second and/or third layers may optionally comprise a homogeneous or non-homogeneous distribution of tobacco extract and/or tobacco flavoring agent.

Figure 5:
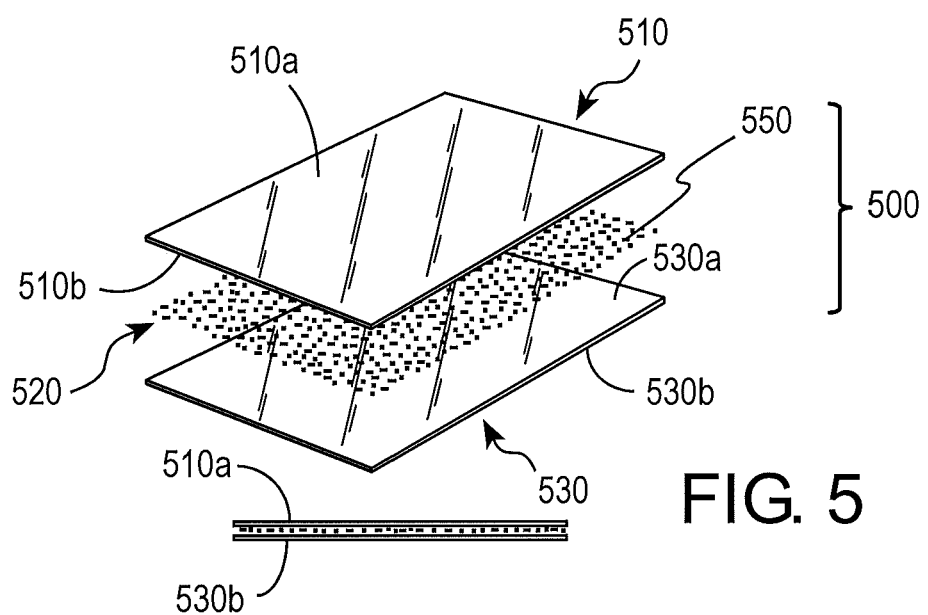
FIG. 5 is an exploded view of a multi-layer dissolvable film strip according to a third embodiment.

FIG. 5 shows an exploded view of a bi-layer film strip 500 according to yet a further embodiment. The film strip 500 comprises first layer 510, second layer 520, and third layer 530. First and third layers comprise thin films while second layer 520 comprises a layer of ground tobacco particles 550. First side 510*a* of first layer 510 forms a free surface and second side 510*b* of first layer 510 is laminated to first side 530*a* of third layer 530. Second side 530*b* of third layer 530 forms a second free surface of the bi-layer film strip 500. Prior to laminating first and third layers together, ground tobacco particles 550 can be deposited on second side 510*b* and/or on first side 530*a*. Thus, ground tobacco particles 550 form second layer 520, which is sandwiched between the first and third layers.

According to the FIG. 5 embodiment, second layer 520 can comprise a substantially homogeneous distribution of ground tobacco particles or second layer 520 can comprise a patterned distribution of ground tobacco particles. Optionally, first and third layers of film strip 500 can further comprise tobacco extract and/or tobacco flavoring agent that is incorporated in one or more of the thin films.

In an additional embodiment, the tobacco film strips can be formed into a roll by binding two edges of the strip to each other. This can be done by rolling the strip while one side is still tacky, until the tacky side contacts the opposing edge. The roll is held in place until the edges adhere and the resulting bond at least partially dries. Alternatively or additionally, a binding agent can be applied to one or both surfaces of the strip near one or more edges to be adhered together. In addition to a simple roll, the strips can be formed into other three-dimensional shapes. For example, the strips can be twisted into a helix or spiral shape, either leaving the ends free or binding the edges together to form a twisted ring. These shapes provide a variety of different mouth-feel sensations to the consumer.

In yet another embodiment, the tobacco film strips can be formed into a pouch, e.g., by folding a portion of the strip over itself, and adhering the edges together, leaving cavity which can be filled with, e.g., shredded or particulate tobacco, reconstituted tobacco which has been shredded or ground into particles, shredded or chopped film strip material, or combinations of these. The resulting pouch provides sufficient flexibility to obtain a variety of different products. For example, the film strip material forming the pouch can be relatively fast dissolving in the mouth, while the material in the cavity can be slower dissolving or insoluble, or may contain flavorants different from those contained in the pouch material. As with the use of multi-layered strips, the result is that the consumer perceives different sensory experiences at different times during consumption of the product, or that the sensory experiences provided by the dissolution of the different parts of the pouch results in sensory experiences not obtainable from consumption of each component individually.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

We claim:

1. A dissolvable smokeless tobacco product comprising:
    55 to 65% by weight ground or powdered tobacco with an average particle size of between about 100 nm and 0.1 mm,
    3 to 12% by weight binder,
    20 to 40% by weight humectant, and
    optionally a flavorant,
    wherein said dissolvable smokeless tobacco product has an oven volatiles content of volatile or semi-volatile tobacco flavor compounds of 17 to about 30%,
    wherein said dissolvable tobacco product is sized and shaped to be placed within an oral cavity of a consumer, and
    wherein the smokeless tobacco product comprises a single-layer film strip and a layer consisting of a substantially homogeneous distribution or a patterned distribution of the ground or powdered tobacco formed on one side of the film strip.

2. The dissolvable smokeless tobacco product of claim 1, in the form of a helix.

3. The dissolvable smokeless tobacco product of claim 1, wherein said binder comprises a pectin and/or a natural gum, and the ground or powdered tobacco consists of a blend of Bright, Burley and/or Oriental tobaccos without inclusion of reconstituted tobaccos.

4. The dissolvable smokeless tobacco product of claim 1, wherein said humectant comprises glycerin, and the ground or powdered tobacco consists of a blend of Bright, Burley and/or Oriental tobaccos without inclusion of reconstituted tobaccos.

5. The dissolvable smokeless tobacco product of claim 1, further comprising one or more additives selected from the group consisting of flavorants, sweeteners, fragrances, coloring agents, filling agents and preservatives.

6. The dissolvable smokeless tobacco product of claim 1, wherein the dissolvable tobacco product includes a flavorant in an amount of up to 6 weight %.

7. The dissolvable smokeless tobacco product of claim 1, wherein said product has an oven volatiles content of 17-18%.

8. The dissolvable smokeless tobacco product of claim 1, which is adapted to dissolve in the oral cavity within less than about 60 seconds.

9. The dissolvable smokeless tobacco product of claim 1, which is adapted to dissolve in the oral cavity within less than about 30 seconds.

10. The dissolvable smokeless tobacco product of claim 1, which is adapted to dissolve in the oral cavity within less than about 20 seconds.

11. The dissolvable smokeless tobacco product of claim 1, wherein the tobacco is a blend of ground or powdered laminae of Bright, Burley and/or Oriental tobaccos with an average particle size between about 1 and about 100 microns.

12. The dissolvable smokeless tobacco product of claim 1, wherein the tobacco is pasteurized tobacco.

13. The dissolvable smokeless tobacco product of claim 7, wherein the tobacco is a blend of ground or powdered laminae of Bright, Burley and/or Oriental tobaccos.

14. The dissolvable smokeless tobacco product of claim 7, wherein the tobacco is pasteurized tobacco.

* * * * *